United States Patent Office 3,591,568
Patented July 6, 1971

3,591,568
POLYMERIZATION PROCESS
Elliott Farber, Trenton, N.J., assignor to
Tenneco Chemicals, Inc.
No Drawing. Filed Jan. 6, 1969, Ser. No. 789,367
Int. Cl. C08f 1/11
U.S. Cl. 260—87.1                                  8 Claims

ABSTRACT OF THE DISCLOSURE

Process for production of solution-grade poly(vinyl chloride-vinyl acetate) copolymers by suspension polymerization of vinyl chloride and vinyl acetate monomers in the presence of an alkylated poly(vinyl pyrrolidone) as a protective colloid and utilizing incremental addition of monomeric vinyl chloride to the reaction mixture.

---

This invention relates to an improved polymerization process for the preparation of solution-grade poly(vinyl chloride-vinyl acetate) copolymers. More particularly, this invention pertains to a process for the production of such copolymers by suspension polymerization using particular protective colloids and controlled introduction of the vinyl chloride monomer to the polymerization reaction mixture.

Heretofore, resins of such grade have been produced via the solution polymerization technique, which was necessary in order to obtain a homogeneous copolymer. This procedure avoided the use of a water-soluble suspension stabilizer which would be deleterious to the clarity of concentrated copolymer solutions in various organic solvents such as methyl ethyl ketone, 4-methyl-2-pentanone commonly called methyl isobutyl ketone, 1:1 mixtures of ketones and toluene, or the other common solvents used in conjunction with the resins in the coatings industry. The use of the solution polymerization procedure necessitates recovering the solvent used and also produces all the hazards to plant personnel normally associated with such an operation especially if the solvent has a relatively low flash point. In addition, the inherent dangers associated with air pollution when using volatile solvents in the polymerization process are also hazards to avoid if possible.

The production of polymers of the poly(vinyl chloride-vinyl acetate) polymer type which yield clear concentrated solutions of relatively low viscosity in industrial solvents is mainly dependent on two factors. These are as follows:

(1) The vinyl acetate should be distributed as uniformly as possible along the copolymer chain of the copolymer product. Since vinyl acetate and vinyl chloride have different refractive indices, a non-uniform comonomer distribution will produce polymer molecules having different refractive indices. A solution of such molecules varying in acetate content may produce a hazy solution. In addition, polymer molecules having less than the expected amount of vinyl acetate will be produced along with some vinyl acetate rich copolymers. The polymers which are poor in vinyl acetate content are more difficult to dissolve and produce hazier and more viscous solutions than the copolymers having higher vinyl acetate contents.

(2) The suspension stabilizer and/or protective colloid, if one is used, should be soluble in the solvents used to dissolve the copolymer in order to avoid clarity being impaired by undissolved protective colloids which remain bound to the copolymer resin after the polymerization is completed and the copolymer has been isolated.

In the past, it has not been possible to find a suspension stabilizer which, when used to produce a poly(vinyl chloride-vinyl acetate) copolymer, can meet the conditions above listed.

The uniform distribution of vinyl acetate in the vinyl acetate-vinyl chloride copolymer depends on its concentration with respect to vinyl chloride and the reactivity ratios of the monomer molecules and their respective free radicals. The reactivity ratios of vinyl acetate and vinyl chloride are such that free radical polymerization of vinyl chloride occurs at a faster rate than vinyl acetate. Since a concentration of about 15% vinyl acetate is the average level of vinyl acetate used in solution-grade copolymers, the total amount of the vinyl chloride cannot be batch-charged if the objective is homogeneous distribution of the monomers along the polymer chain.

However, it is known that uniform distribution of vinyl acetate interspaced with the vinyl chloride occurs when all the vinyl acetate is initially charged to the polymerization reactor with only a minor amount of the total vinyl chloride to be used, followed by either continuously or incrementally addition of the remainder of the vinyl chloride. Alternatively, a homogeneous comonomer distribution along the polymer chain can also be obtained by continuously or incrementally addition of a predetermined specified ratio of vinyl chloride and vinyl acetate to the reactor.

To simplify the later reactor additions, if all the vinyl acetates is initially charged, the initial charge may contain 50% or more by weight of vinyl acetate as compared to vinyl chloride although the final resin copolymer composition will be 85% vinyl chloride and 15% vinyl acetate. The suspension stabilization efficiency of a protective colloid may possibly be quite satisfactory in a suspension mixture of 85% vinyl chloride to 15% vinyl acetate but relatively very poor in a suspension mixture of equal parts vinyl acetate to vinyl chloride. This type of limited protective suspending power is shown, for example, by gelatin (either acid and/or alkaline treated) which, however, is commonly used as the protective colloid for both vinyl chloride homopolymer and vinyl chloride/vinyl acetate copolymers containing a maximum of 17% vinyl acetate in the monomer mixture charged. If, however, a 1:1 weight ratio of vinylchloride to vinyl acetate is present at the beginning of the polymerization, the protective ability of gelatin to prevent coalescence and agglomeration of polymerizing particles is very poor.

In accord with the known art of suspension polymerizations the protective colloids used in the suspension polymerization of vinyl chloride homopoymers and copolymers are those of water-soluble type. Such protective colloids used in the production of poly(vinyl chloride), have included, for example, gelatin, cellulose derivatives, poly(vinyl alcohol), poly(vinyl pyrrolidone), and other water miscible polymers. Certain water insoluble inorganic salts, such as phosphates and carbonates, have also been suggested as offering suspension stability. None of these materials have, however, provided to be entirely satisfactory in meeting the conditions necessary to produce solution-grade resins.

It has been unexpectedly found that certain water-insoluble polymers can be used as the sole suspension stabilizer to polymers and copolymers of vinyl chloride, These particular protective colloid polymers are alkylated poly(vinyl pyrrolidone) polymers with the alkylation having been effected by alpha-olefins, such as butene-1 hexadecene-1 and eicosene-1, and the like. It is possible that alkylation can occur simultaneously with polymerization of the vinyl pyrrolidone or it can take place after the poly(vinyl pyrrolidone) has been formed. The resultant alkylated poly(vinyl pyrrolidones) thus differ in the weight percent of vinyl pyrrolidone to alpha-olefin and also in molecular weight. The alkylated polymers are known commercially as Ganex V Polymers and are usually designated in three numbers; the first number indicating the weight percent of vinyl pyrrolidone in the copolymer, and the last two numbers indicating the chain length of the alpha-olefin. For example, Ganex V-816 is an alkylated copolymer containing 80% vinyl pyrrolidone and 20% (by weight) of hexadecene-1, while Ganex V-220 is an alkylated copolymer containing 20% (by weight) of vinyl pyrrolidone and 80% (by weight) of eicosene-1. The "V" in the Ganex designation indicates alkylation occurred simultaneously with polymerization. In particular, the commercial products known as Ganex V-816, Ganex V-516, and Ganex V-804 types of copolymers have been found to give the best control of particle size in polymerizations to make solution-grade copolymers via continuous or incremental addition of monomer(s). It has also been observed that better control of particle size is achieved if the Ganex V copolymer used as suspension stabilizer is dissolved in an organic solvent prior to being dispersed in the water for the polymerization.

Thus, the protective colloids which were found especially useful in the present process for making solution-grade copolymers are derivatives of poly(vinyl pyrrolidone). They are alkylation derivatives characterized by having alkyl groups, having from 3 to 20 carbons, incorporated into the molecule. In general, the alkylation is done by means of an alpha-olefin of the selected chain length. Preferred are olefins of $C_3$ to $C_{20}$. The alkylation can be done simultaneously with or subsequent to the polymerization reaction to form the poly(vinyl pyrrolidone). These polymers have varying degrees of hydrophobic/hydrophilic characteristics which depend on the degree of polymerization and the degree and kind of alkylation. They are generally soluble in and/or compatible with all kinds of organic solvents and oils. The useful ones for the invention include those having molecular weights of 9,500 to 25,000, although this molecular weight range is not unduly critical and those having molecular weights from 5,000 up to 50,000 can be employed.

The amounts of the colloid required can be from about 0.05 up to 5% (solids), preferably from about 0.05 to 0.40% by weight, based on the total monomers charged. Lesser amounts tend to give little effect and use of greater amounts is wasteful and does not give correspondingly better results.

The improved suspension polymerization process of this invention is carried out using the operating procedures known in the art. The monomers, or mixtures of monomers are dispersed in the liquid phase and are maintained in suspension, together with monomers added during the reaction as discrete particles in the aqueous phase, by means of dispersing agents and with agitation. Deionized water is usually employed as the liquid phase for the polymerization system. In carrying out such polymerizations, it is customary to charge the entire amount of water initially.

For most purposes reaction temperatures of from about 120 to 180° F. can be employed, preferably temperatures of from about 140 to 160° F. The time of reaction is not critical, the polymerization being allowed to proceed until at least 75% of the total amount of monomers have been converted and preferably at least from 85% up to 98% or the conversion level at which copolymer quality and distribution of the monomers therein is not impaired.

In addition to the monomers and the deionized water, there must also be present a free radical type of catalyst capable of polymerizing unsaturated compounds having the vinyl group ($CH_2=CR_1R_2$) in the molecule. These catalysts are well-known in the art and may be, for example, peroxides, percarbonates or azo compounds, or a redox system can be used together with one or more reducing agents. Typical of peroxides which are useful are benzoyl peroxide, lauroyl peroxide, ditertiary butyl peroxide, cumene hydroperoxide, and the like. Oxygen itself as well as hydrogen peroxide can also be used. It is also possible to use a source of ferric ions with a peroxide such as hydrogen peroxide. The amounts of such catalysts employed are well known in the art and may constitute from 0.01 to 2% by weight or higher.

The aqueous polymerization mixtures may also contain conventional emulsifiers, wetting agents, surfactants, and the like; although with the use of the alkylated poly(vinyl pyrrolidone), such materials may be eliminated from the mixtures, or their amounts may be drastically reduced.

In accordance with one of the preferred methods of practicing the process of this invention, all of predetermined amount of vinyl acetate is charged initially into the reactor together with a relatively small amount (from 5 to 20%) of the total amount of the required vinyl chloride. The remaining (from 80 to 95%) amount of vinyl chloride is added either in increments or continuously during the period of the polymerization.

Control over the degree of polymerization may be aided by the use of one or more chain transfer agents in the reactor. The useful agents are of the conventional type which are well-known for this purpose are chloroform, carbon tetrachloride, trichloroethylene, and the like.

The vinyl chloride-vinyl acetate copolymer dispersions which are obtained by the process of the invention are substantially free of such extraneous material as soaps, wetting agents, inorganic salts, emulsifiers, and are advantageously employed in products where such impurities are disadvantageous.

The copolymer products are useful in preparation of coatings, in impregnating compositions, in coatings for films, and the like. The polymers can be processed to give dry, polymeric products which are useful in molding compositions and for similar end uses.

The copolymers so prepared are characterized by having the vinyl acetate copolymerized uniformly therein, this characteristic being present even though the copolymers have from 75 to 95% of vinyl chloride and from 5 to 25% of vinyl acetate.

The following examples are presented as illustrative only. All parts are by weight unless otherwise specified.

EXAMPLE 1

Into an agitated polymerization reactor there was charged the materials set forth below. After the water, gelatin, and lauroyl peroxide were added to the reactor, the reactor was evacuated by means of reduced pressure (vacuum) on the system and the vinyl acetate and chain transfer agent were added, after which the vinyl chloride was charged.

| Material: | Parts by wt. |
|---|---|
| Water (deionized) | 160 |
| Vinyl acetate | 16 |
| Vinyl chloride | 84 |
| Trichloroethylene | 0.8 |
| Gelatin | 0.29 |
| Lauroyl peroxide | 0.13 |

The reaction temperature was maintained at about 156° F. and the polymerization proceeded until at least 92% conversion of monomers to copolymer had been achieved.

As will be seen later from Table II, the resin produced from Example 1, when prepared as a 20% by weight solution in 1:1 MIBK-toluene, produces a very hazy viscous solution.

EXAMPLE 2

In a manner similar to that described in Example 1 above the following reagents were charged to an agitated reactor.

| Material: | Parts by wt. |
|---|---|
| Water (deionized) | 166 |
| Vinyl acetate | 16 |
| Vinyl chloride | 84 |
| Trichloroethylene | 0.8 |
| Ganex V-816 | 0.35 |
| Lauroyl peroxide | 0.09 |

The reaction temperature was about 156° F. and the polymerization proceeded until at least 92% conversion of monomer to copolymer had been achieved. As will be seen later from Table II, the resin produced from Example 2, when prepared as a 20% by weight solution in 1:1 MIBK-toluene, produces a very hazy viscous solution.

EXAMPLE 3

The following materials were charged to an agitated polymerization reactor.

| Material: | Parts by wt. |
|---|---|
| Water (deionized) | 166 |
| Vinyl acetate | 16 |
| Vinyl chloride (initial) | 10 |
| Vinyl chloride (incremental addition over 10 hours) | 74 |
| Ganex V-816 | 0.35 |
| Trichloroethylene | 0.8 |
| Lauroyl peroxide | 0.17 |

In this instance, the water, lauroyl peroxide, and poly(vinyl pyrrolidone) solution were charged to the reactor. After obtaining a vacuum, the chain transfer agent and vinyl acetate were added. Then, only 10 parts of the vinyl chloride monomer was initially charged prior to bringing the batch up to the reaction temperature. The initial weight percent of vinyl acetate in the monomer mixture was 61.5%. An additional 10 parts of vinyl chloride was added every hour until a total of 84 parts of vinyl chloride had been charged over a 10-hour period.

The reaction temperature was held at about 154° F. and polymerization proceeded to the same degree of conversion as that obtained in Example 2 as indicated by pressure measurements. As can be seen from Table II, the resin produced in Example 3, when prepared as a 20% by weight solution in 1:1 MIBK-toluene, produces a very clear, low viscosity solution in contrast to those made from resins in Examples 1 and 2.

EXAMPLE 4

The relative viscosities of polymers are generally taken as being indicative of an average molecular weight of a vinyl chloride homopolymer and/or copolymer and it is well known and accepted in the polyvinyl chloride polymerization art that the relative viscosity is generally inversely related to the reaction temperature; i.e., the higher the reaction temperature, the lower is the value of the relative viscosity. The relative viscosity values obtained in Examples 1-3 are shown in Table I.

The relative viscosities of the resins prepared in Examples 1-3 were obtained from 1.00 weight percent solutions in cyclohexanone. The relative viscosity is obtained from the ratio of flow times of 10 ml. of the solvent at 25° C. in a Canon-Fenske Viscometer in which the flow time of the solvent is between 120-300 seconds.

TABLE I

| Copolymer: | Relative viscosity |
|---|---|
| Product/Example 1 | 1.59 |
| Product/Example 2 | 1.57 |
| Product/Example 3 | 1.52 |

It is seen from Table I that the relative viscosity of a 1.0% solution of Example 3 copolymer is lower than that of the other examples, even though the polymerization reaction temperature was 2° F. lower. Theoretically the lower reaction temperature would have been expected to raise the molecular weight and relative viscosity of the copolymer. The unexpected, lower relative viscosity can be attributed to a more chemically homogeneous copolymer produced by the incremental monomer addition as described in detail in Example 3 above. The absence of copolymers with low acetate content tends to prevent molecular agglomeration and therefore yield resins with lower apparent molecular weights and relative viscosities.

EXAMPLE 5

A common use for a solution-grade copolymer comprises dissolving it at room temperature in a mixed solvent system composed of a 1:1 ratio of methyl isobutyl ketone (4-methyl-2-pentanone) to toluene and then using such solutions to coat various substrates, evaporating off the solvents and leaving a film of the copolymer coating the substrate. The appearance of the solution, with respect to its clarity, and the viscosity of such a 20% solution, with respect to its fluidity and ease of spreading (the lower the viscosity, the easier it is to spread the solution over a substrate) are important properties which are taken into account in commercial consideration and/or approval.

Twenty-five grams of each of the resins of the three examples was slowly added to 100 grams of a 1:1 mixture of methyl-isobutyl ketone toluene at room temperature with mild agitation. Agitation was kept up for six hours. The visual appearance and the percent light transmission at 640 mu of such solutions and/or suspensions are shown in Table II below:

TABLE II

| Resin sample | Visual rating for clarity [1] | Percent transmission for (vs. solvent) at 640 mu [2] | Brookfield viscosity, centipoises [3] |
|---|---|---|---|
| Product/Example 1 | 2.0 | 17 | 1,000+ |
| Product/Example 2 | 1.5 | 9 | 1,000+ |
| Product/Example 3 | 9.5 | 96 | 377 |

[1] A visual rating of 10 is the highest and this is given to a 1:1 mixture of ketone and toluene alone (no polymer).
[2] Percent transmission measured against a 1:1 methyl-isobutyl ketone/toluene sample in a Beckman UV spectrophotometer, Model DB, Beckman Instrument Co., Fullerton, Calif.
[3] Brookfield Synchro-Lectric Viscometer Model RVT, Brookfield Engineering Labs, Stoughton, Mass. The 20% mixtures in 1:1 ketone/toluene were kept in a water bath at 25° C. for 24 hours prior to measuring the Brookfield viscosities with an LV-1 spindle at 20 r.p.m. after one minute.

It can be seen that the copolymer product, as prepared by the process of Example 3, produces a much clearer and less viscous solution when dissolved in the mixed solvent system at room temperature than the other resins. A copolymer produced via the incremental addition of vinyl chloride monomer, as in Example 3, cannot be prepared when 0.35 part of gelatin is used as the suspension stabilizer since sever coalescence and agglomeration occurs during the polymerization and particle size control is lost. The copolymers so obtained cannot be used commercially. The particle sizes obtained in Examples 1-3 above described had 0-1 weight percent retained on 45-mesh sieve, (U.S. Standard Sieve Series, ASTM specifications) from 9-34 weight percent retained on an 80-mesh sieve, and 65-91 weight percent passing through an 80-mesh sieve. The particle size distribution can be modified slightly by variations in the rate of agitation, the kinetic rate, and reactor design.

The poor clarity and high Brookfield viscosities of 20% solutions of copolymer resins from Examples 1 and 2 prepared at room temperature in a 1:1 methyl isobutyl ketone/toluene solvent system is attributed to this mixed solvent being a relatively poor solvent for such resins. It is believed that there is a wide divergence in the vinyl acetate distribution in the polymer chains formed in such batch-charged suspension polymerizations as those described in Examples 1 and 2. For example, there may be present only a minute amount of resin containing 0-2% vinyl acetate together with some copolymer molecules having more than 30% vinyl acetate. The overall average acetate content found in these copolymers, as determined by infrared (IR) spectrophotometric analysis, approaches that initially charged into the polymerization only when the percent conversion is about 92% or higher. The copolymer molecules having the poorest solubility in 1:1 ketone/toluene will be those with the least amount of acetate. These will produce hazy suspensions because of their state of incomplete molecular dissolution. The high Brookfield viscosities can also be attributed to the poor degree of solvation of molecules containing low acetate levels, resulting in molecular aggregation at room temperature and, hence, high viscosity values.

A comparison of the Brookfield viscosity measurements in Table II illustrates the lower viscosity of a copolymer having the more uniform vinyl acetate distribution achieved by continuous or incremental addition of the more reactive monomer during progress of the polymerization. One explanation for this is the greater ease of solvation dissolution of such copolymers compared to the greater difficulty in molecularly dissolving polymers having substantially lower vinyl acetate content such as would be present in heterogeneous copolymer compositions such as are formed in batch charging reactions as illustrated by Examples 1 and 2. More energy is required to break up these copolymer aggregates, i.e., by heating, before the higher degree of solvation can be achieved. A similar situation exists when attempting to dissolve polyvinyl chloride homopolymers. Unless heat is applied in such attempts large molecular aggregates result rather than a molecular dispersed solution.

If one heats the 20% solutions of Examples 1 and 2 at 80° C. for several minutes, much clearer and less viscous solutions result as the result of breakup of molecular aggregates. The clarity of these solutions in 1:1 ketone/toluene after heating for 10 minutes at 80° C. under mild agitation, is shown in Table III and indicates the haziness which can be attributed to the different suspension stabilizers.

TABLE III

| Resin sample: | Percent transmission vs. solvent at 640 mu |
|---|---|
| Product/Example 1 | 91 |
| Product/Example 2 | 96 |

The term "incremental addition" as used throughout this specification and in the claims is intended to encompass the addition of one or more of the monomeric reactants to the reaction mixture during the reaction period in a manner wherein portions of the reactant or reactants are fed continuously or periodically to the reaction zone. This distinguishes "incremental addition" from procedures wherein the entire predetermined amounts of reactants are added initially or at the same time to the reaction zone.

Although the invention has been described above in connection with certain preferred features, it will be understood that various modifications and changes may be made without departing from the broader aspects of the invention.

What is claimed is:
1. In a suspension polymerization process for the preparation of solution-grade copolymers that contain from 75 percent to 95 percent of vinyl chloride and from 5 percent to 25 percent of vinyl acetate which comprises reacting vinyl chloride and vinyl acetate monomers in an aqueous reaction mixture and in the presence of a free radical-producing initiator, the improvement which comprises adding vinyl chloride incrementally during the polymerization to a reaction mixture that initially contains at least 50 percent by weight of vinyl acetate, about 0.05 percent to 5 percent, based on the total weight of vinyl acetate and vinyl chloride monomers, of a water insoluble alkylated poly(vinyl pyrrolidone), and about 5 percent to 20 percent of the total amount of vinyl chloride monomer that is required for the formation of the copolymer.
2. In the process of claim 1 wherein the alkylated poly(vinyl pyrrolidone) has alkyl groups containing from 3 to 20 carbon atoms and a molecular weight ranging from about 5,000 to about 50,000.
3. In the process of claim 2 wherein the molecular weight of the alklylated poly(vinyl pyrrolidone) is within the range of about 9,500 to 25,000.
4. In the process of claim 1 wherein the amount of alkylated poly(vinyl pyrrolidone) in the reaction mixture ranges from about 0.05 to 0.4% by weight.
5. In the process of claim 1 wherein the polymerization reaction is carried out at a temperature of from about 120 to 180° F.
6. In the process of claim 1 wherein the free radical-producing imitator is a peroxide.
7. In the process of claim 1 wherein all of the vinyl acetate monomer is initially added to the reaction mixture.
8. In the process of claim 1 where the vinyl acetate and vinyl chloride are fed to the reaction mixture by incremental addition.

References Cited

FOREIGN PATENTS 932,134   7/1963   Great Britain _____ 260—871

OTHER REFERENCES

Vinyl Chloride-Vinyl Acaetate Copolymers, Thomas et al., British Plastics (December 1958), pp. 522–525.

JAMES A. SEIDLECK, Primary Examiner

S. M. LEVIN, Assistant Examiner

U.S. Cl. X.R.

260—32.8, 33.6, 88.1, 88.3, 92.8